(12) United States Patent
Maresh et al.

(10) Patent No.: US 11,062,001 B2
(45) Date of Patent: Jul. 13, 2021

(54) MATRIX TRANSFORMATION-BASED AUTHENTICATION

(71) Applicant: International Business Machines Corporation, Armonk, NY (US)

(72) Inventors: Mark Maresh, Wake, NC (US); Colm Nolan, Navan (IE); Juan F. Vargas, Cary, NC (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 91 days.

(21) Appl. No.: 16/373,040

(22) Filed: Apr. 2, 2019

(65) Prior Publication Data

US 2020/0320180 A1    Oct. 8, 2020

(51) Int. Cl.

| | |
|---|---|
| *G11C 7/00* | (2006.01) |
| *G06F 13/00* | (2006.01) |
| *G06F 12/14* | (2006.01) |
| *G06F 7/04* | (2006.01) |
| *G06F 21/31* | (2013.01) |
| *G06F 9/30* | (2018.01) |
| *G06F 17/16* | (2006.01) |

(52) U.S. Cl.
CPC .......... *G06F 21/31* (2013.01); *G06F 9/30029* (2013.01); *G06F 17/16* (2013.01)

(58) Field of Classification Search
CPC ....... G06F 21/31; G06F 9/30029; G06F 17/16
USPC .......................................................... 726/19
See application file for complete search history.

(56) References Cited

U.S. PATENT DOCUMENTS

| | | | |
|---|---|---|---|
| 5,295,188 A | * | 3/1994 | Wilson .................... H04L 9/302 235/379 |
| 6,243,816 B1 | | 6/2001 | Fang et al. |
| 7,065,517 B1 | * | 6/2006 | Austin .............. G06F 16/90339 |
| 8,392,975 B1 | | 3/2013 | Raghunath |
| 8,966,276 B2 | | 2/2015 | Nanopoulos et al. |

(Continued)

FOREIGN PATENT DOCUMENTS

WO    2013061171 A1    5/2013

OTHER PUBLICATIONS

Daigo Muramatsu; Arbitrary View Transformation Model for Gait Person Authentication; IEEE:2012: pp. 85-90.*

(Continued)

*Primary Examiner* — Monjur Rahim
(74) *Attorney, Agent, or Firm* — Cantor Colburn LLP; Tihon Poltavets

(57) ABSTRACT

Methods, systems and computer program products for providing matrix transformation-based authentication are provided. Aspects include storing an original matrix having a plurality of cells. Each of the plurality of cells is in a selected state or an unselected state. Aspects also include receiving an original pin from a user device. The original pin includes a plurality of characters. Aspects also include selecting a bit operation. Aspects also include generating a modified matrix based on the original matrix, the original pin, and the bit operation. Aspects also include transmitting the modified matrix to the user device. Responsive to receiving a user authentication request comprising an authentication pin and an authentication matrix, aspects further include authenticating a user.

17 Claims, 10 Drawing Sheets

(56) References Cited

U.S. PATENT DOCUMENTS

| | | | |
|---|---|---|---|
| 9,338,163 B2 | 5/2016 | Wendling et al. | |
| 2006/0041762 A1* | 2/2006 | Ma | H04L 9/002 713/189 |
| 2006/0218524 A1* | 9/2006 | Solioz | G07F 7/10 717/106 |
| 2011/0135167 A1* | 6/2011 | Imaoka | G06F 21/32 382/118 |
| 2011/0259962 A1* | 10/2011 | Picard | G06K 7/1434 235/437 |
| 2014/0109208 A1 | 4/2014 | Song | |
| 2015/0046993 A1* | 2/2015 | Arceo | H04L 63/0838 726/7 |
| 2015/0295720 A1 | 10/2015 | Buldas et al. | |
| 2016/0182486 A1 | 6/2016 | Wu et al. | |
| 2016/0283709 A1* | 9/2016 | Potnuru | G06F 21/36 |
| 2017/0329944 A1* | 11/2017 | Satyavarapu | H04L 63/10 |
| 2018/0232508 A1* | 8/2018 | Kursun | G06F 21/316 |
| 2019/0104121 A1* | 4/2019 | Khandani | H04L 9/0891 |
| 2019/0347397 A1* | 11/2019 | Cramer | G06T 17/20 |

OTHER PUBLICATIONS

Burrows et al., "A Logic of Authentication," ACM Transactions on Computer Systems, vol. 8, No. 1, Feb. 1990, pp. 18-36.

Fan et al., "Robust remote authentication scheme with smart cards," Elsevier Computers & Security, Mar. 28, 2005, pp. 619-628.

Gong et al., "A novel one-time password mutual authentication scheme on sharing renewed finite random sub-passwords," Elsevier Inc., Journal of Computer and System Sciences, 79, 2013, pp. 122-130.

Lamport, "Password Authentication with Insecure Communication," Communications of the ACM, vol. 24, No. 11, Nov. 1981, pp. 770-772.

Sun et al., "oPass: A User Authentication Protocol Resistant to Password Stealing and Password Reuse Attacks," IEEE Transactions on Information Forensics and Security, vol. 7, No. 2, Apr. 2012, pp. 651-663.

Wikipedia, "Bitwise operations in C," Wikipedia.org; URL: https://en.wikipedia.org/wiki/Bitwise_operations_in_C. Retrieved Mar. 25, 2019. 8 pages.

* cited by examiner

MATRIX TRANSFORMATION-BASED AUTHENTICATION

BACKGROUND

The present invention generally relates to processing systems, and more specifically, to providing matrix transformation-based authentication.

Processing systems can be used to access secure or protected data. In order to access the secure or protected data, a user may be required to authenticate itself in order to be granted access. For example, the user enters a username and password to gain access to a secure portion of a website. Basic username and password authentication is common and easy to implement but can also be less secure than other authentication techniques. Some websites, applications, data stores, etc., implement more advanced authentication techniques. For example, a financial institution, an online medical chart, etc., can require multiple levels of authentication (i.e., multi-factor authentication) for a user to access secure or protected data. Multi-factor authentication requires that a user present multiple separate pieces of evidence to gain access to secure or protected data.

SUMMARY

Embodiments of the present invention are directed to a computer-implemented method for providing matrix transformation-based authentication. A non-limiting example of the computer-implemented method includes storing an original matrix having a plurality of cells. Each of the plurality of cells is in a selected state or an unselected state. The method also includes receiving an original pin from a user device. The original pin includes a plurality of characters. The method also includes selecting a bit operation. The method also includes generating a modified matrix based on the original matrix, the original pin, and the bit operation. The method also includes transmitting the modified matrix to the user device. Responsive to receiving a user authentication request comprising an authentication pin and an authentication matrix, the method includes authenticating a user.

Embodiments of the present invention are directed to a system for providing matrix transformation-based authentication. The system includes a memory having computer readable computer instructions, and a processor for executing the computer readable instructions. The computer readable instructions include instructions for storing an original matrix having a plurality of cells. Each of the plurality of cells is in a selected state or an unselected state. The computer readable instructions also include instructions for receiving an original pin from a user device. The original pin includes a plurality of characters. The computer readable instructions also include instructions for selecting a bit operation. The computer readable instructions also include instructions for generating a modified matrix based on the original matrix, the original pin, and the bit operation. The computer readable instructions also include instructions for transmitting the modified matrix to the user device. Responsive to receiving a user authentication request comprising an authentication pin and an authentication matrix, the computer readable instructions include instructions for authenticating a user.

Embodiments of the invention are directed to a computer program product for providing matrix transformation-based authentication, the computer program product comprising a computer readable storage medium having program instructions embodied therewith. The computer readable storage medium is not a transitory signal per se. The program instructions are executable by a processor to cause the processor to perform a method. A non-limiting example of the method includes storing an original matrix having a plurality of cells. Each of the plurality of cells is in a selected state or an unselected state. The method also includes receiving an original pin from a user device. The original pin includes a plurality of characters. The method also includes selecting a bit operation. The method also includes generating a modified matrix based on the original matrix, the original pin, and the bit operation. The method also includes transmitting the modified matrix to the user device. Responsive to receiving a user authentication request comprising an authentication pin and an authentication matrix, the method includes authenticating a user.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
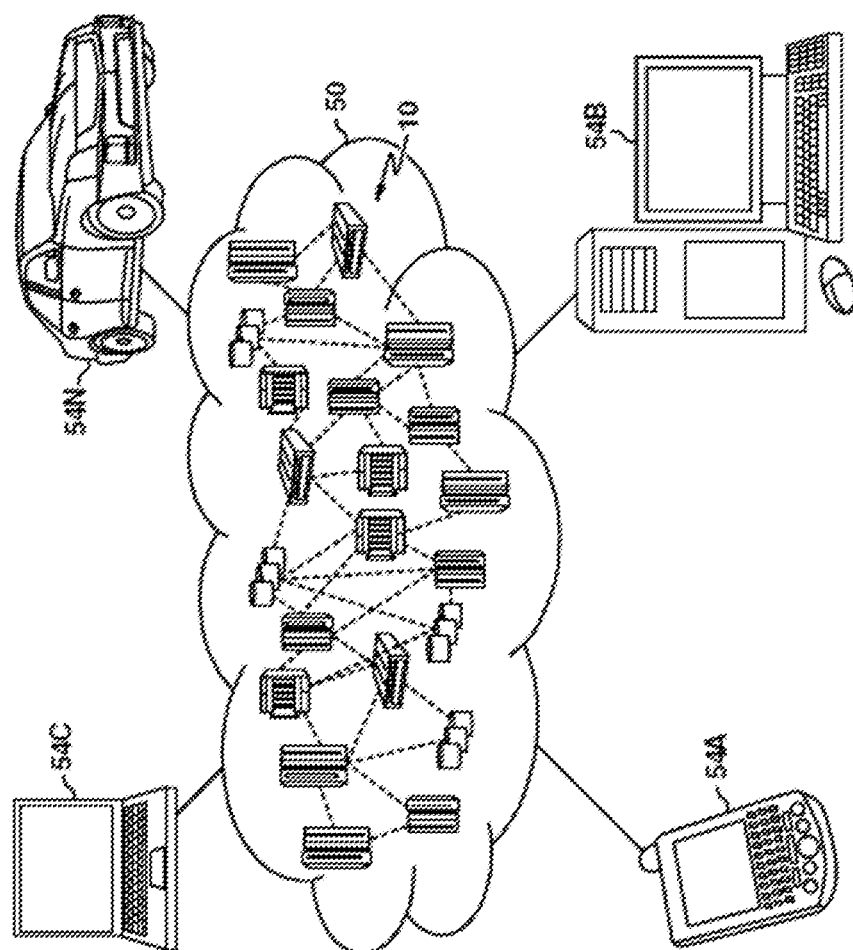
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
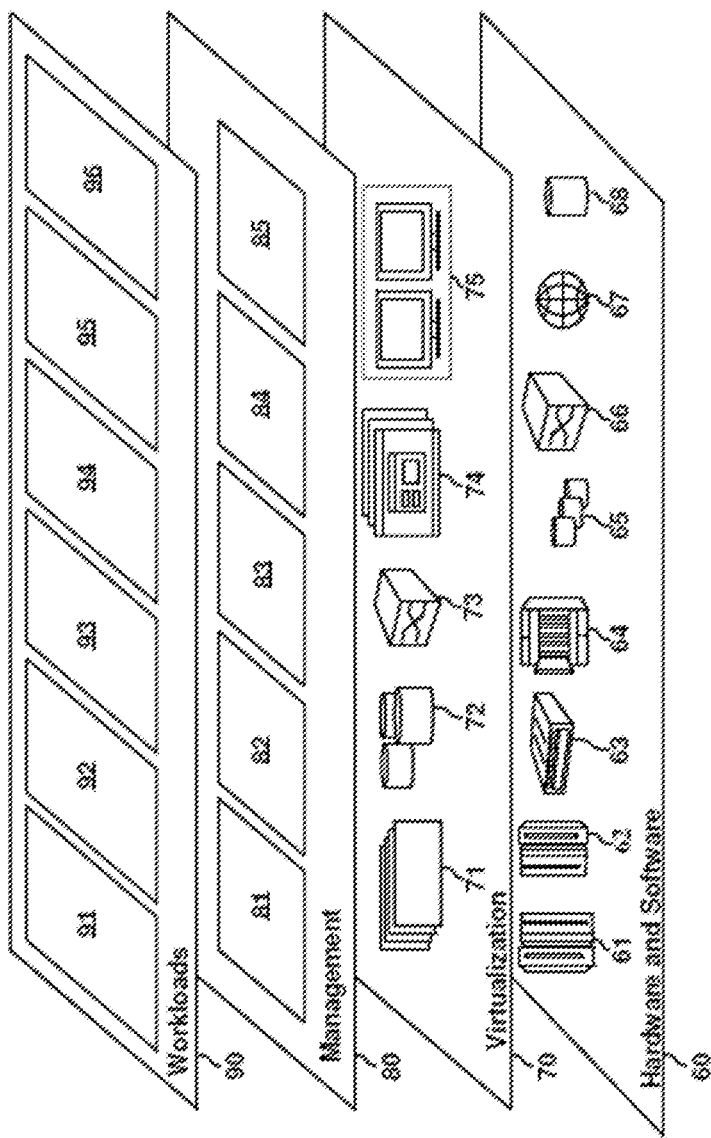
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing matrix transformation-based authentication 96.

Figure 3:
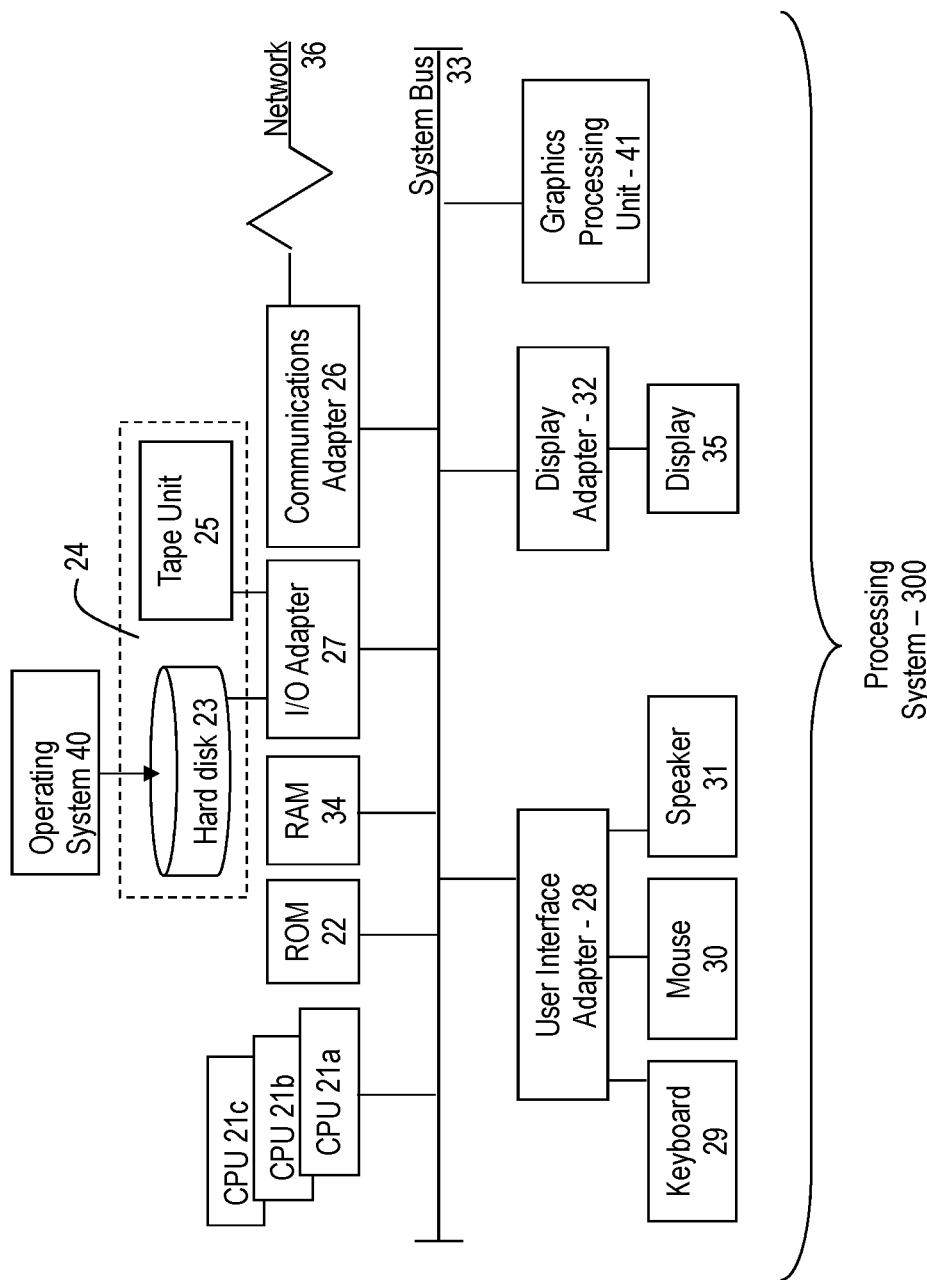
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the present disclosure, techniques for matrix transformation-based authentication are provided. Common authentication techniques involve requiring a user to provide an identification of the user (e.g., a username, account number, etc.) in combination with a passcode, such as a password or pin. However, if the password or pin is obtained by a bad actor, it may allow the bad actor to impersonate the identified user. Some authentication techniques, such as multi-factor authentication, may utilize additional information beyond a user's login credentials to authenticate the identity of the user in order to, for example, grant the user with access to an account. Some authentication techniques may for example, gather location data from a user to perform a location-based authentication. Other authentication techniques use images to authenticate a user. For example, some authentication techniques present an image or images to a user and require that the user select the correct image, images, order of images, etc., in order to be authenticated. However, such techniques require a user to utilize a device that is capable of determining the user's location or generating a digital video.

Turning now to an overview of the aspects of the invention, one or more embodiments of the invention address the above-described shortcomings of the prior art by providing matrix transformation-based authentication of a user based on a user-submitted pin and a random transformation of a stored original matrix. In particular, the present techniques provide system or data access by authenticating the user's identity based on receipt of a user-provided pin and a modified matrix. To configure the system, a user provides a pin that is used to modify an original matrix using a random bit operation to generate an authentication matrix. The authentication matrix may then be sent to the user's device for storage and the pin and authentication matrix may be deleted from the processing system responsible for performing the authentication. Thus, if either the user device or the processing system are individually accessed by an unauthorized user, in either case, the unauthorized user would not be able to access all of the information needed to impersonate the user during the authentication process, which provides greater security. During authentication of a user, the user may transmit the pin and the stored authentication matrix to the processing system, which may then transform the stored original matrix based on the pin and a stored bit operation to generate a modified matrix. The system may then authenticate the user in response to determining that the received authentication matrix matches the newly generated modified matrix. The system may then generate a new authentication matrix by performing another random bit operation on the original matrix based on the pin and then may transmit the new authentication matrix to the user device for use in the next authentication. In this way, the processing system only stores the original matrix and the last bit operation but needs the pin and the authentication matrix from the user in order to authenticate the user. By changing the authentication matrix used in each successive authentication, the system provides further security advantages by alleviating the concern that a previous authentication matrix intercepted by a bad actor could be used to attempt to impersonate the user. Thus, the system provides for secure authentication of a user and only requires that the user remember their pin and provide storage and transmission of the authentication matrix via a user device.

Example embodiments of the disclosure include or yield various technical features, technical effects, and/or improvements to technology. Example embodiments of the disclosure provide enhanced processing and data security by using matrix transformation-based authentication of a user for authentication to restricted resources by receiving a pin and an authentication matrix from the user and validating the authentication matrix received from the user against the modified matrix generated based on the user-provided pin to authenticate the user. These aspects of the disclosure constitute technical features that yield the technical effect granting the user access to a restricted resource when it is determined that the user is authenticated. Accordingly, unauthorized access can be reduced, thereby improving computing systems by providing heightened security. As a result of these technical features and technical effects, a system in accordance with example embodiments of the disclosure represents an improvement to existing system and data security techniques. It should be appreciated that the above examples of technical features, technical effects, and improvements to technology of example embodiments of the disclosure are merely illustrative and not exhaustive.

Figure 4:
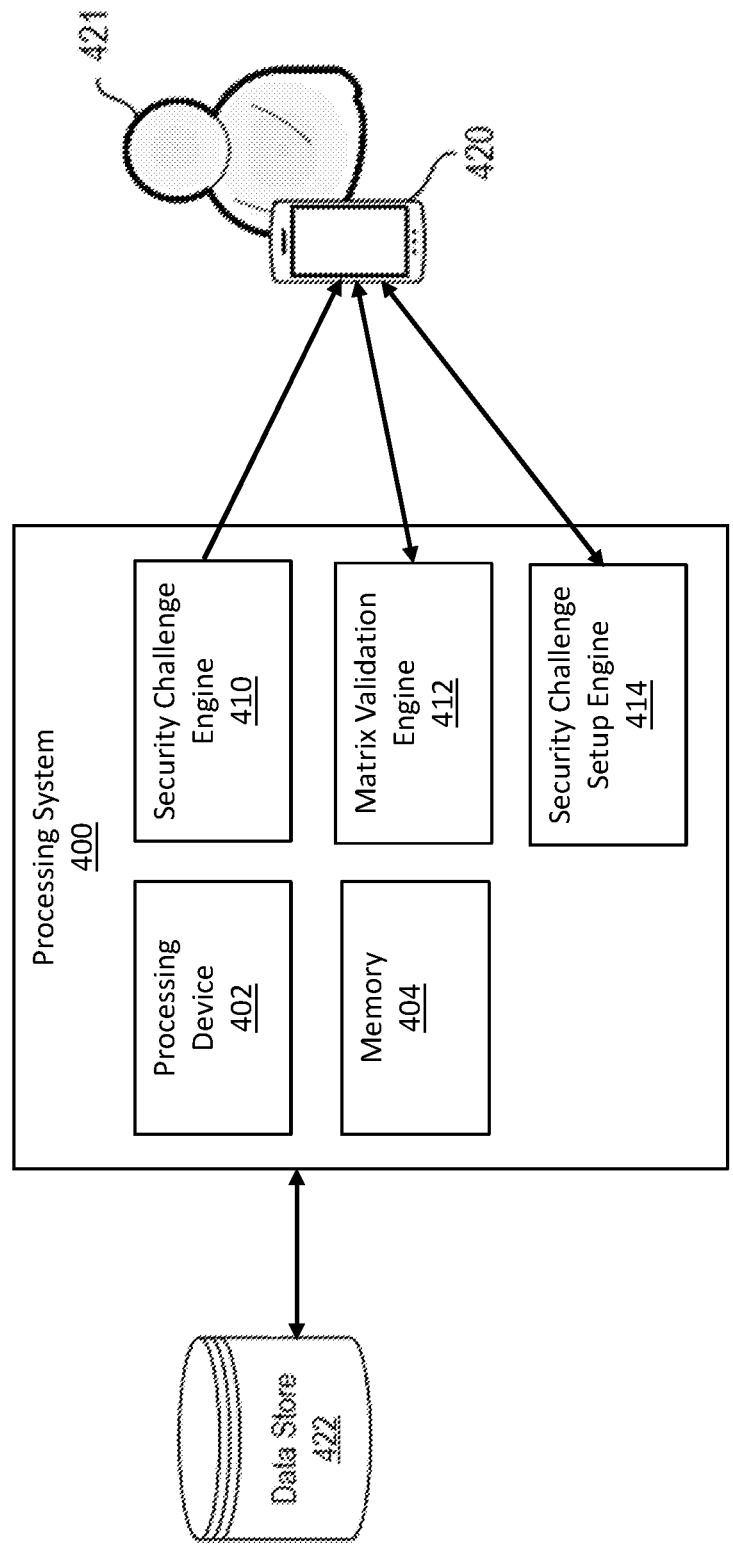
FIG. 4 depicts a system upon which providing matrix transformation-based authentication may be implemented according to one or more embodiments of the present invention.

FIG. 4 depicts a block diagram of a processing system 400 for providing video authentication of a user, according to aspects of the present disclosure. The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein.

The processing system 400 includes the processing device 402, the memory 404, a security challenge engine 410, a matrix validation engine 412 and a security challenge setup engine 414. The security challenge engine 410 issues a security challenge to a user device 420 associated with a user 421 in response to, for example, a user attempting to access a restricted resource such as for example, logging into a secure account via a website.

The security challenge engine 410 prompts the user to provide a pin and an authentication matrix that can be used to authenticate the user 421 and the user device 420 to enable the user to access a restricted resource (e.g., a processing system, data, etc.). For example, upon attempting to log into an account by providing a username and password, the security challenge engine 410 may issue a security challenge to user device 420 requesting that the user provide a pin and an authentication matrix. Failure to provide an appropriate pin and authentication matrix may prevent user 421 from accessing the restricted resource (e.g., prevent a user from accessing the account).

Figure 5A:
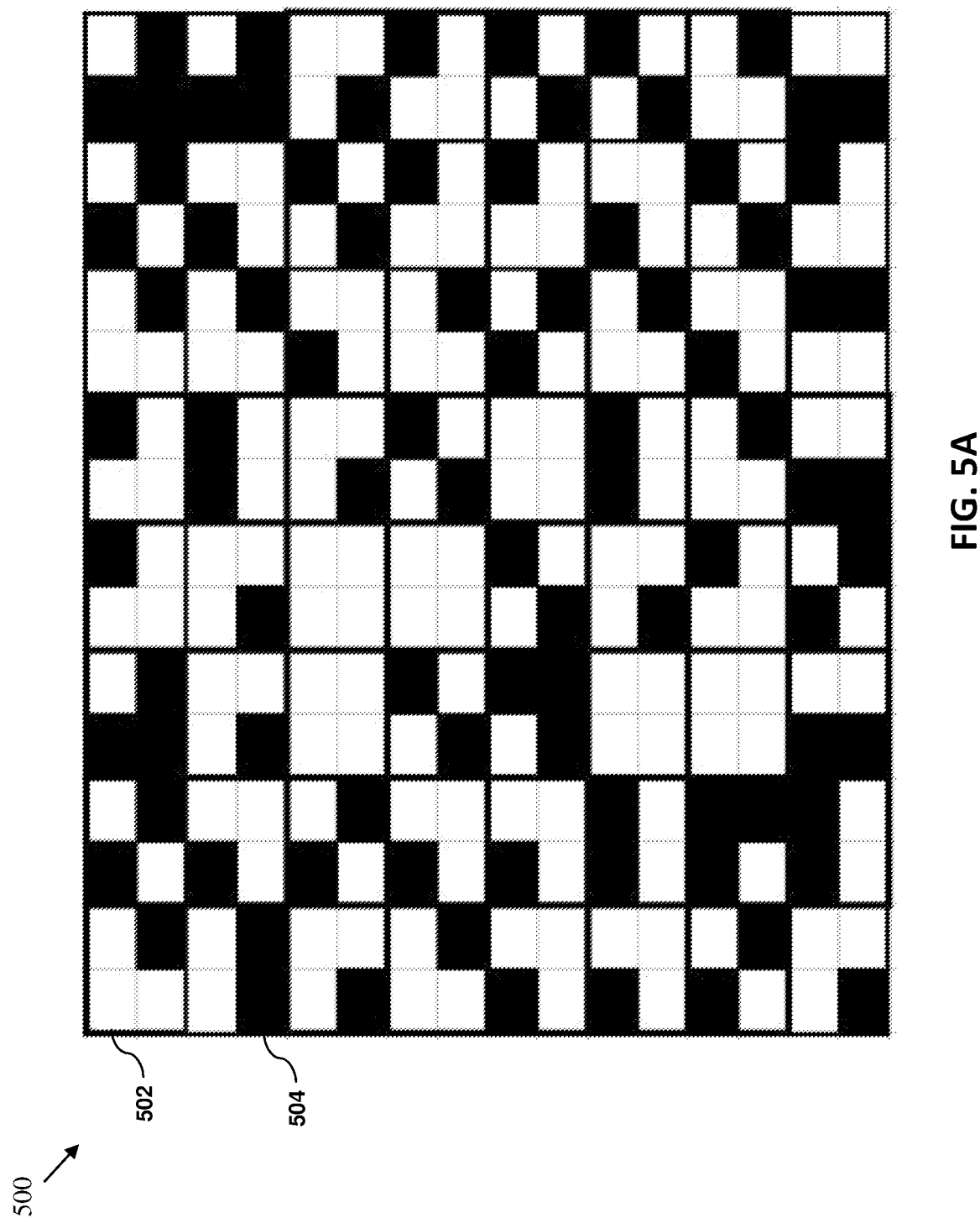
FIG. 5A depicts an example original matrix for use in a matrix transformation-based authentication process according to one or more embodiments of the present invention.

According to aspects of the present disclosure, the processing system 400 can also include a security challenge setup engine 414 that enables the user 421 to perform an initial setup of the security challenge. The security challenge can be set up using the security challenge setup engine 414, which enables the user 421 to provide an original matrix and a pin. A pin may be any string of letters, numbers or other characters that may be converted into a binary and/or American Standard Code for Information Interchange (ASCII) representation. According to some embodiments, to create an original matrix, the user can be presented with a blank matrix and may select any number of cells of the matrix to toggle from an unselected state to a selected state. FIG. 5A shows an example of an original matrix 500. As shown in FIG. 5A, the original matrix may be a 16×16 matrix having a number of unselected cells 502 (depicted as empty cells) and a number of selected cells 504 (depicted as filled in cells). According to some embodiments, the security challenge setup engine 414 may transmit a blank matrix (i.e., all cells being empty) to user device 420 and user device 420 may include software that allows the user to select any number of the empty cells of the blank matrix to designate them as selected cells. This user selection of cells ensures a very high likelihood that the original matrix will be unique to the user. The original matrix may then be transmitted to the security challenge setup engine 414 along with user-specified pin. The security challenge setup engine 414 may store the original matrix and generate an authentication matrix based on the pin as described in greater detail below. The security challenge setup engine 414 may then transmit the authentication matrix to the user device 420 and delete the authentication matrix and pin from the memory 404 of processing system 400 such that neither is stored by the processing system 400. Although the previous description describes that the creation of the original matrix occurs via user-selection, according to some embodiments, an original matrix may instead be randomly generated by security challenge engine 414 and stored in association with the user. Further, although the example original matrix 500 shown in FIG. 5A is a 16×16 matrix, it is contemplated that the matrices used in accordance with embodiments of the techniques described herein may be of many different sizes and this example is not intended to be limiting. The original matrix, the randomly selected bit operation(s) used to generate an authentication matrix, and any other such data can be stored in any suitable repository, such as the data store 422, which can be integrated into the processing system 400 and/or accessible by the processing system 400, such as over a network.

Figure 5B:
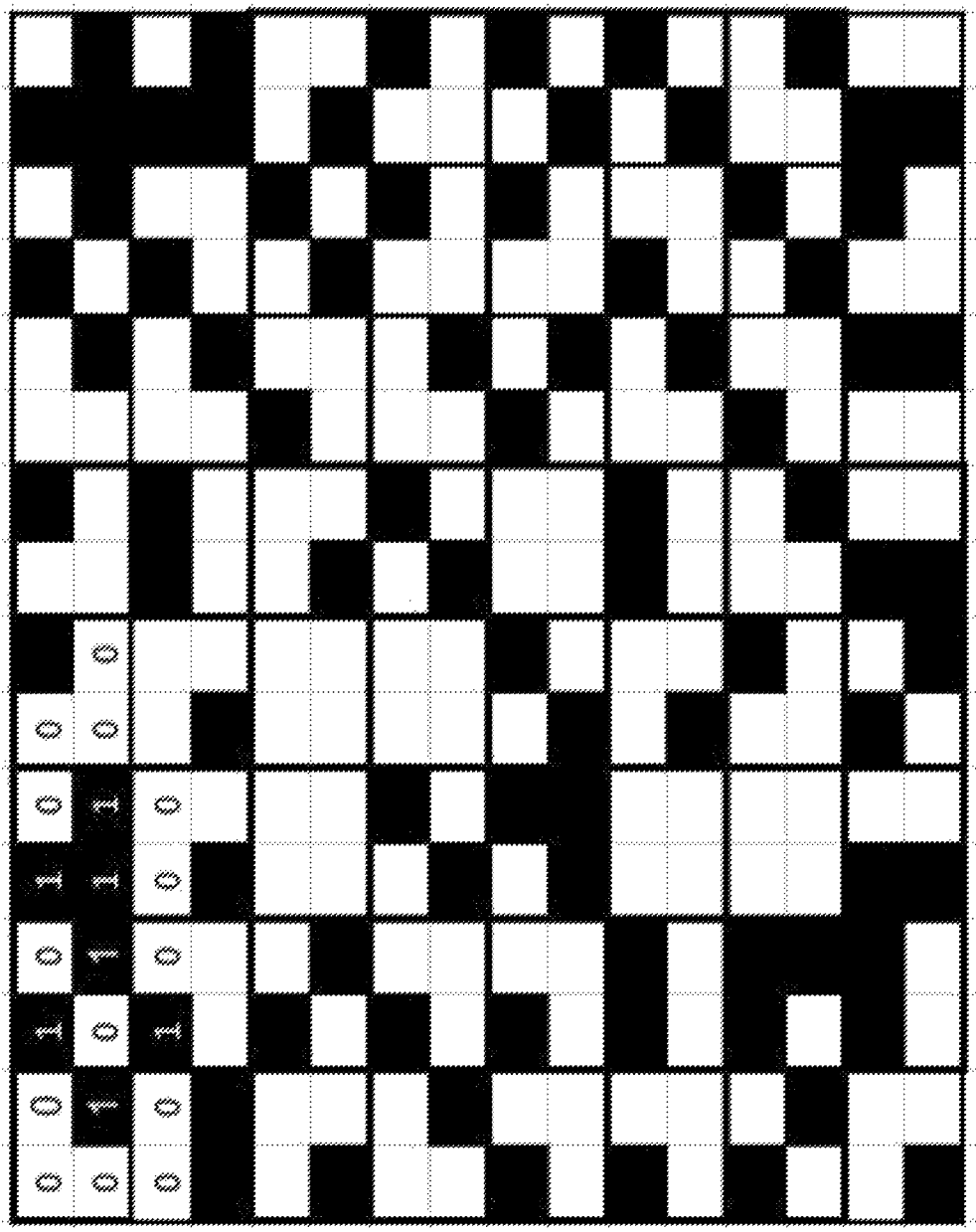
FIG. 5B depicts an assignment of values to the example original matrix for use in a matrix transformation-based authentication process according to one or more embodiments of the present invention.
Figure 5C:
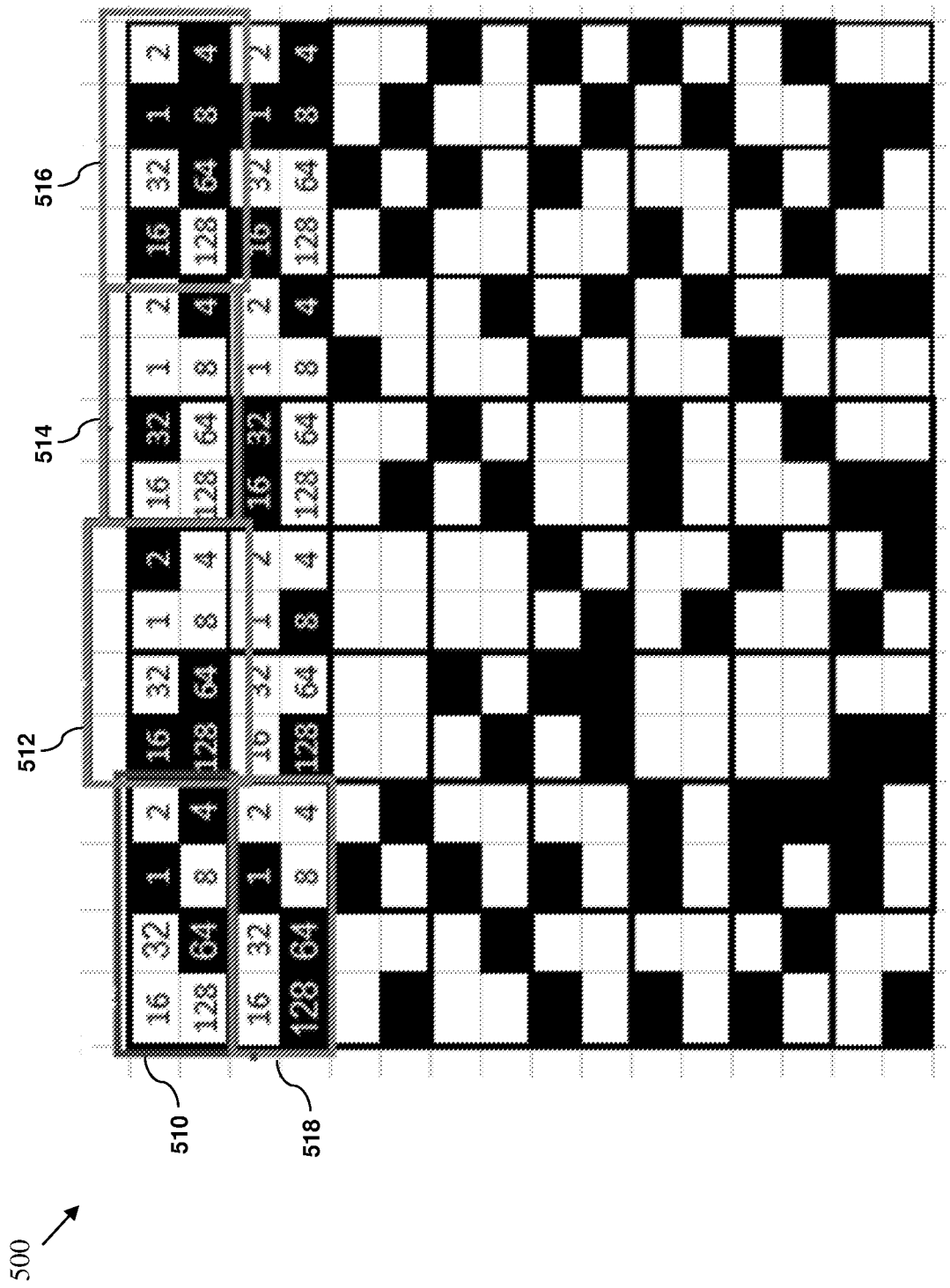
FIG. 5C depicts an assignment of bit positions to groups of cells in an example original matrix for use in a matrix transformation-based authentication process according to one or more embodiments of the present invention.

As mentioned above, the security challenge setup engine 414 can generate an authentication matrix based on a user-submitted pin by randomly selecting a bit operation and applying it to the stored original matrix based on the pin. As will be appreciated by those of skill in the art, bit operations are operations that can be applied to binary numbers and can include for example, operations such as AND, OR, NOR, NAND, XOR, NOT, left shift (i.e., shifting bits to the left), right shift (i.e., shifting bits to the right) or any other known bitwise operation or combination of bitwise operations. For example, as will be understood by those of skill in the art, there are 16 truth functions of two binary variables that may be used to perform operations on the binary variables to generate an output. FIGS. 5B-5E illustrate various stages of an example transformation of the original matrix to an authentication matrix, in accordance with embodiments of the invention. As shown in FIG. 5B, the security challenge and setup engine 414 may assign a "0" or a "1" value to cells of the original matrix based on whether the cell is in a selected or an unselected state. For example, cells in an unselected state may be assigned a value of "0" and cells in a selected state may be assigned a value of "1". Although FIG. 5B only depicts the assignment of values to a group of the first several cells, it will be understood that all cells in the original matrix will be assigned a value in this manner. As shown in FIG. 5C, the security challenge setup engine 414 may group the cells into groups of eight cells (or eight bits). For example, FIG. 5C shows that the first four columns of the first two rows make up a first group 510, the next four columns of the first two rows make up a second group 512, the next four columns of the first two rows make up a third group 514, the last four columns of the first two rows make up a fourth group 516, the first four columns of the third and fourth rows make up a fifth group 518, and so on. Although FIG. 5C only depicts the first five groupings of cells, it should be understood that the entirety of the original matrix will be divided into groups in this manner. As will be understood by those of skill in the art, each group of eight cells can form an 8-bit binary number. As shown in FIG. 5C, in some embodiments, each cell of a group may be assigned a random place within the 8-bit number format, such that for example, the cell in the first row and first column of the first group 510 has been assigned the 16th place, the cell in the first row and second column of the first group 510 has been assigned the $32^{nd}$ place, and so on, such that an 8-bit number may be formed by placing each value of a given cell in the corresponding place of an 8-bit binary number. Thus, the values of the first group 510 may be rearranged in accordance with their corresponding place positions as shown in Table 1.

TABLE 1

| 128 bit | 64 bit | 32 bit | 16 bit | 8 bit | 4 bit | 2 bit | 1 bit |
|---------|--------|--------|--------|-------|-------|-------|-------|
| 0       | 1      | 0      | 0      | 0     | 1     | 0     | 1     |

Thus, in this example, the security challenge setup engine 414 generates an 8-bit number of "0100-0101" from the first group 510 of cells. In the same manner, the second group 512 of cells may be translated into the 8-bit number "1101-0010", the third group 514 of cells may be translated into the 8-bit number "0010-0100", the fourth group 516 of cells may be translated into the 8-bit number "0101-1101", and so on for all groups of cells of the original matrix 500. Although this example provides a step of assigning random place values to each of the cells of a group, in some embodiments the values may be placed into an 8-bit number in accordance with a predetermined order (e.g., placing them in order of left to right and top to bottom).

The security challenge setup engine 414 may convert the pin received from the user into a plurality of 8-bit numbers by taking the ASCII value of each character of the pin. For example, if a pin is "A456/", as will be understood by those of skill in the art the pin may be converted to 8-bit numbers in accordance with Table 2.

TABLE 2

| Char | ASCII | Pin Bits |
|---|---|---|
| A | 65 | 0100-0001 |
| 4 | 52 | 0011-0100 |
| 5 | 53 | 0011-0101 |
| 6 | 54 | 0011-0110 |
| / | 47 | 0010-1111 |

Figure 5D:
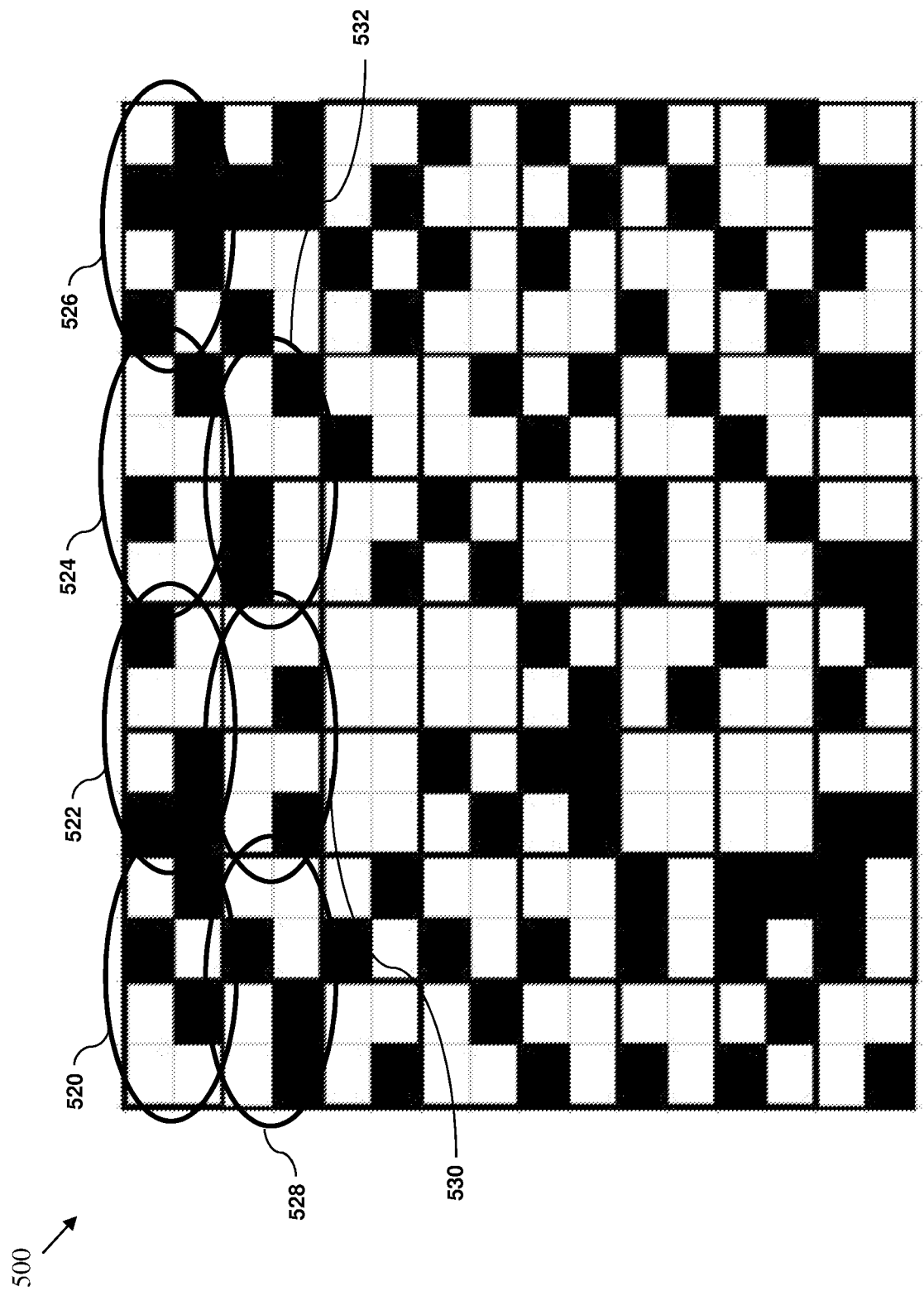
FIG. 5D depicts an identification of groups of cells of the example original matrix to be associated with characters of a pin for use in a matrix transformation-based authentication process according to one or more embodiments of the present invention.

As shown in FIG. 5D, security challenge engine 410 may assign each character of the pin to a selected group of cells in the original matrix 500. For example, a first group 520 may be assigned to the "A" character, a second group 522 of cells may be assigned to the "4" character, a third group 524 of cells may be assigned to the "5" character, a fourth group 526 of cells may be assigned to the "6" character, a fifth group 528 of cells may be assigned to the "/" character, a sixth group 530 of cells may be assigned to the "A" character, a seventh group 532 of cells may be assigned to the "4" character, and so on. Thus, each 8-bit group of cells may be associated with a character of the pin, and characters of the pin may be reused as necessary until all groups of the original matrix are associated with a character of the pin. The 8-bit values of the pin can then be correlated to the 8-bit values of each group of the original matrix as shown in Table 3, which only shows a portion of all the groups of the original matrix for illustrative purposes.

TABLE 3

| Char | ASCII | Pin Bits | Cell Values |
|---|---|---|---|
| A | 65 | 0100-0001 | 0100-0101 |
| 4 | 52 | 0011-0100 | 1101-0010 |
| 5 | 53 | 0011-0101 | 0010-0100 |
| 6 | 54 | 0011-0110 | 0101-1101 |
| / | 47 | 0010-1111 | 1100-0001 |
| A | 65 | 0100-0001 | 1000-1000 |
| 4 | 52 | 0011-0100 | 0011-0100 |

Security challenge engine 410 may then randomly select and apply a bit operation to each pair of pin bits and cell values. It should be understood that the term "random" or "randomly" may refer to a pseudo-random selection or number generation. For example, security challenge engine 410 may randomly select an XOR operation, which when applied to the pairs of 8-bit numbers will generate the transformed bits shown in Table 4.

TABLE 4

| Char | ASCII | Pin Bits | Cell Values | Transformed Bits |
|---|---|---|---|---|
| A | 65 | 0100-0001 | 0100-0101 | 0000-0100 |
| 4 | 52 | 0011-0100 | 1101-0010 | 1110-0110 |
| 5 | 53 | 0011-0101 | 0010-0100 | 0001-0001 |
| 6 | 54 | 0011-0110 | 0101-1101 | 0110-1011 |
| / | 47 | 0010-1111 | 1100-0001 | 1110-1110 |
| A | 65 | 0100-0001 | 1000-1000 | 1100-1001 |
| 4 | 52 | 0011-0100 | 0011-0100 | 0000-0000 |

Figure 5E:
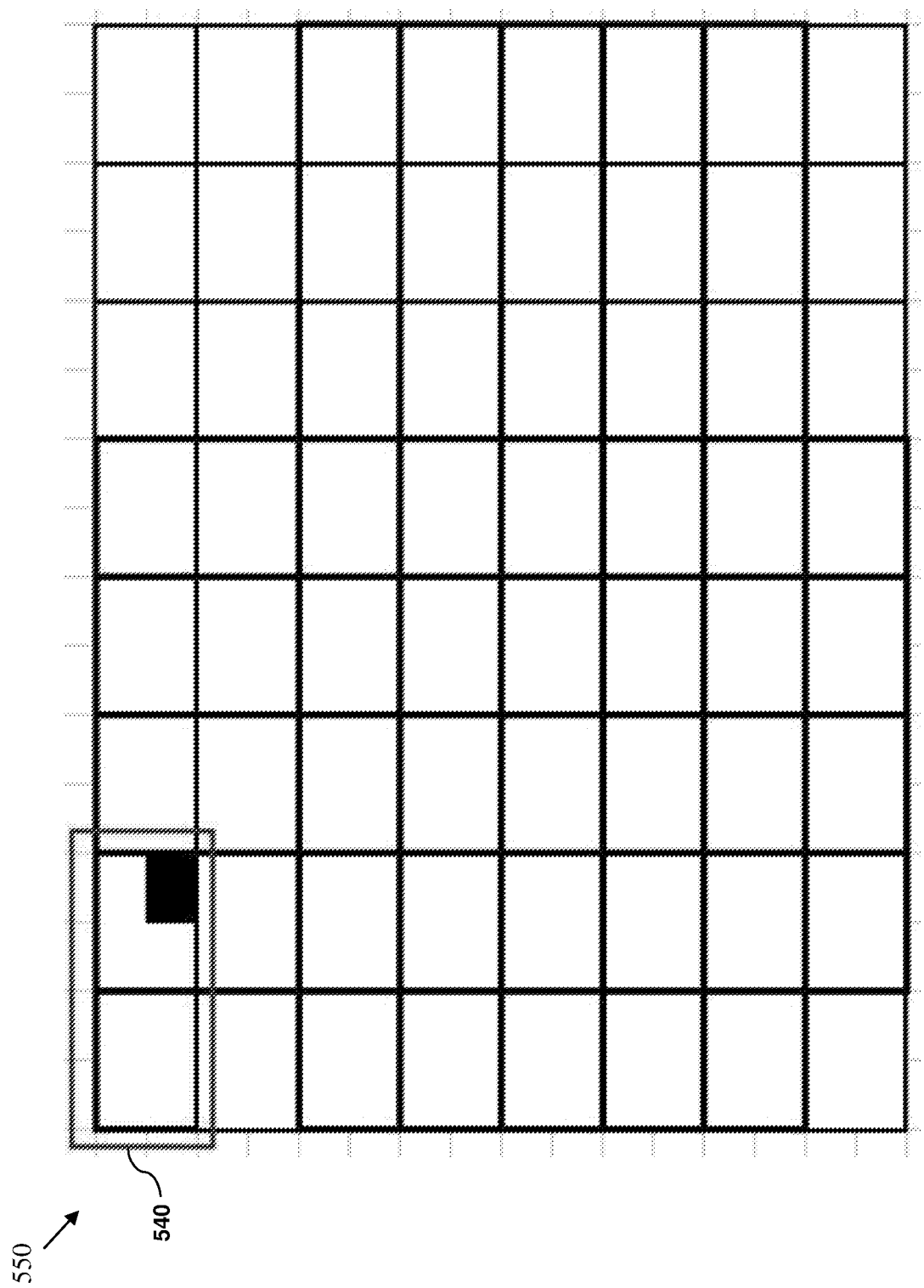
FIG. 5E depicts an example partially transformed matrix for use in a matrix transformation-based authentication process according to one or more embodiments of the present invention.

Although Table 4 only depicts a transformation of the first seven groups of cells of the original matrix, it should be understood that this process will be applied to all groups of the matrix. Security challenge setup engine 414 may then assemble a transformed matrix 550 as the authentication matrix from the collection of transformed bits generated by the process of above. For example, the transformation bits of the first group are 0000-0100 can be represented as a new group 540 of cells as shown in FIG. 5E. In this example, the only "1" (i.e. "selected") value of the transformed bits is in the 4-bit place. With reference back to FIG. 5C, the 4-bit place of the first group 510 of cells corresponds to the fourth column in the second row and so the transformed group is created by generating a filled-in block at this location. Although the transformation matrix 550 shown in FIG. 5E only depicts the creation of the first transformed group 540 of cells, it should be understood that security challenge setup engine 414 will apply this process to all groups of cells of the original matrix to generate the remainder of the transformation matrix 550. Once the entirety of the original matrix 500 is transformed in this matter, the security challenge setup engine 414 may transmit the transformed matrix to the user device 420 as the authentication matrix. Although the matrix transformation process above has been described in the context of the security challenge setup engine 414 creating an initial authentication matrix, it should be understood that the matrix validation engine may apply the same procedure to generate a modified matrix based on the received pin in order to validate an authentication matrix received from the user device 420 and may also use this procedure to generate a new authentication matrix to send to the user to replace the original (or any subsequent) authentication matrix upon a successful authentication.

The example provided above is not intended to be limiting and it is contemplated that one or more steps of the transformation of the original matrix into a transformed matrix can be omitted or added to in accordance with various embodiments. For example, other embodiments may utilize different sized matrices, may utilize different sizes of binary numbers (e.g., 16-bit or 4-bit instead of 8-bit), and/or may utilize randomization of different portions of the matrix or operations. For example, although the preceding example describes applying a single bit operation to the entire matrix, it is contemplated that in some embodiments, a combination of different bit operations may be applied to different portions of the matrix. According to some embodiments, the system may receive a user-input number of iterations along with the pin and following the generation of a modified matrix as described above, the system may apply the pin the modified matrix to generate a new modified matrix and may repeat this process for the number of iterations specified by the user. In some embodiments, each iteration may use the same randomly selected bit operations, whereas in other embodiments, a different randomly selected bit operation may be used for each iteration. Thus, in some embodiments, a user supplied number of iterations may be used to provide an additional level of security. Further, although FIGS. 5A-5E depict a visual form of matrix, those of skill in the art will understand that matrices may be represented in various different formats that are logically or mathematically equivalent to the examples shown in FIGS. 5A-5E and embodiments of the disclosure may utilize any known representation or format of matrix representation.

In response to a security challenge, the user 421 can use the user device 420 (or another suitable device) to enter the user's pin and transmit the pin and the stored authentication matrix to the processing system 400. The matrix validation engine 412 receives the authentication matrix and pin from the user device 420 associated with the user 421 and validates the authentication matrix by comparing it to a modified matrix generated from the stored original matrix based on the received pin and a stored bit operation (i.e., the same bit operation used to by the security challenge setup engine 414 to initially create the authentication matrix). The matrix validation engine 412 will authenticate the user if the received authentication matrix matches the newly generated modified matrix. If the user is successfully authenticated, the matrix validation engine 412 may then generate a new authentication matrix by transforming the stored original matrix based on the pin and a new randomly selected bit operation. The new bit operation will be stored and the new matrix will then be transmitted to the user device 420 for use in the next authentication. Matrix validation engine 412 may delete the new authentication matrix from processing system 400 after it has been transmitted to the user device 420.

Figure 6:
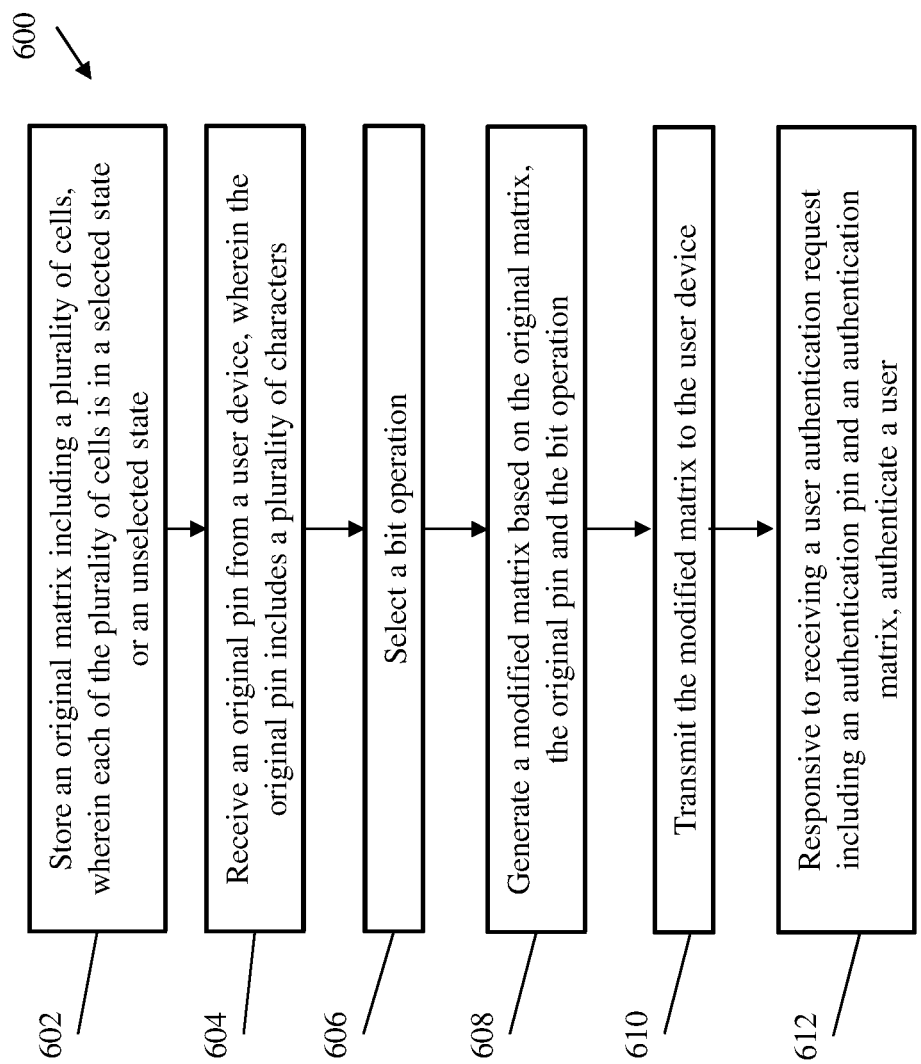
FIG. 6 depicts a flow diagram of a method for providing matrix transformation-based authentication according to one or more embodiments of the invention.

Turning now to FIG. 6, a flow diagram of a method 600 for providing matrix transformation-based authentication in accordance with an embodiment is shown. In one or more embodiments of the present invention, the method 600 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, the processing system 400 described herein above and illustrated in FIG. 4, or in some other type of computing or processing environment.

The method 600 begins at block 602 and includes storing (e.g., via processing system 400) an original matrix comprising a plurality of cells. According to some embodiments, each of the plurality of cells may be in a selected state or an unselected state. In some embodiments, each of the plurality of cells of the original matrix has a state that may be selected by a user. For example, as previously described above, a user device 420 may present a user 421 with a blank matrix and allow the user to select a number of cells of the matrix to be in a selected state. Alternatively, in some embodiments, an original matrix may be generated by processing system 400 by randomly selecting cells of a blank matrix to be selected cells.

As shown at block 604, the method includes receiving (e.g., via processing system 400) an original pin from a user device. In some embodiments, the original pin includes a plurality of characters.

As shown at block 606, the method includes selecting (e.g., via processing system 400) a bit operation. According to some embodiments, the bit operation can be one of an AND operation, an OR operation, a NAND operation, or an XOR operation. The bit operation may be pseudo-randomly selected by processing system 400. As described above, in some embodiments, more than one bit operation may be randomly selected for application to different portions of the original matrix.

As shown at block 608, the method includes generating (e.g., via processing system 400) a modified matrix based on the original matrix, the original pin, and the bit operation. A modified matrix may be of the same dimensions as the original matrix and each cell may be in a selected state or an unselected state. According to some embodiments, the original matrix may be transformed into a modified matrix in accordance with one or more of the steps described above with respect to FIGS. 5A-5E.

For example, according to some embodiments, generating the modified matrix may include subdividing the plurality of cells of the original matrix into a plurality of groups of cells, wherein each group of cells comprises a predetermined number cells, for each group of cells, converting the group of cells into an N-bit cell number based on the states of each cell in the group of cells, converting each of the plurality of characters of the original pin into an N-bit pin character number, for each group of cells, performing the bit operation on the N-bit cell number and an n-bit pin character number corresponding to one of the plurality of characters of the original pin to generate an N-bit modified cell number, and converting each N-bit modified cell number into a matrix representation to collectively form a modified matrix. As described previously above with respect to FIGS. 5A-5E, the predetermined number of cells may be for example, 8 cells, and each N-bit number may be an 8-bit number. However, it should be appreciated that in some embodiments, N may be 4, 16, 32, 64 or any other appropriate number designated by a designer of the system.

According to some embodiments, converting an N-bit modified cell number into a matrix representation may include, for each bit of an N-bit modified cell number, creating a cell that is in an unselected state in response to determining that a value of the bit is zero and creating a cell that is in an selected state in response to determining that a value of the bit is one. While this description generally describes unselected cells as being associated with a "0" value and selected cells as being associated with a "1" value, it should be appreciated that in some embodiments, unselected cells may alternatively be associated with a "1" value and selected cells may be associated with a "0" value.

According to some embodiments, as shown in FIGS. 5B-5C and described previously above, converting a group of cells into an N-bit cell number based on the states of each cell in the group of cells may include pseudo-randomly assigning each cell of the group of cells to correspond to an Nth place of the N-bit cell number, where the N-bit cell number has N places and for each of the N places of the N-bit cell number, and inserting a value of zero or one based on whether the cell assigned to the Nth place is in a selected state or an unselected state.

According to some embodiments, the method may further include storing the bit operation and deleting the original pin from memory by the processing system 400. In this way, the processing system 400 may perform an authentication of the user without having to store the user's pin number, which, as will be appreciated, provides security benefits should an unauthorized user access the processing system 400. As shown at block 610, the method includes transmitting (e.g., via processing system 400) the modified matrix to the user device 420. The modified matrix may then be stored by the user device 420 as an authentication matrix to be used in a future authentication attempt.

As shown at block 612, the method includes authenticating (e.g., via processing system 400) a user in response to receiving a user authentication request comprising an authentication pin and an authentication matrix. According to some embodiments, authenticating a user may include generating a verification matrix based on the original matrix, the authentication pin and the bit operation, comparing the verification matrix to the authentication matrix and authenticating the user in response to determining that the verification matrix matches the authentication matrix. In other words, the processing system 400 may transform the stored original matrix using the received pin and the stored bit operation to generate a validation matrix to compare to the received authentication matrix and if the two matrices match then the user will be authenticated. However, if the matrices do not match then the user's authentication request will be denied.

According to some embodiments, the method 600 may further include selecting (e.g., via processing system 400) a new bit operation, generating a new modified matrix based on the original matrix, the authentication pin, and the new bit operation, and transmitting the new modified matrix to the user device 420. Thus, as previously described above, upon each successful authentication, the processing system 400 may generate and provide the user device 420 with a new authentication matrix to use in the next authentication request.

Additional processes may also be included. It should be understood that the processes depicted in FIGS. 5A-5D and 6 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    storing an original matrix comprising a plurality of cells, wherein each of the plurality of cells is in a selected state or an unselected state;
    receiving, from a user device, an original pin, wherein the original pin comprises a plurality of characters;
    selecting a bit operation;
    generating, based on the original matrix, the original pin, and the bit operation, a modified matrix;
    storing the bit operation and deleting the original pin from memory;
    transmitting the modified matrix to the user device, and subsequently deleting the modified matrix from memory; and
    responsive to receiving a user authentication request from the user device, the request comprising an authentication pin and the modified matrix, authenticating a user.

2. The computer-implemented method of claim 1, wherein each of the plurality of cells of the original matrix has a state that is selected by a user.

3. The computer-implemented method of claim 1, wherein the bit operation comprises one of an AND operation, an OR operation, a NAND operation, or an XOR operation.

4. The computer-implemented method of claim 3, wherein the bit operation is pseudo-randomly selected.

5. The computer-implemented method of claim 1, wherein generating the modified matrix comprises:
    subdividing the plurality of cells of the original matrix into a plurality of groups of cells, wherein each group of cells comprises a predetermined number cells;
    for each group of cells, converting the group of cells into an N-bit cell number based on the states of each cell in the group of cells;
    converting each of the plurality of characters of the original pin into an N-bit pin character number;
    for each group of cells, performing the bit operation on the N-bit cell number and an n-bit pin character number corresponding to one of the plurality of characters of the original pin to generate an N-bit modified cell number; and
    converting each N-bit modified cell number into a matrix representation to collectively form a modified matrix.

6. The computer-implemented method of claim 5, wherein converting an N-bit modified cell number into a matrix representation comprises, for each bit of an N-bit modified cell number:
    responsive to determining that a value of the bit is zero, creating a cell that is in an unselected state; and
    responsive to determining that a value of the bit is one, creating a cell that is in an selected state.

7. The computer-implemented method of claim 5, wherein the predetermined number of cells comprises 8 cells and each N-bit number is an 8-bit number.

8. The computer-implemented method of claim 5, wherein converting a group of cells into an N-bit cell number based on the states of each cell in the group of cells comprises:
    pseudo-randomly assigning each cell of the group of cells to correspond to an Nth place of the N-bit cell number, the N-bit cell number comprising N places; and
    for each of the N places of the N-bit cell number, insert a value of zero or one based on whether the cell assigned to the Nth place is in a selected state or an unselected state.

9. The computer-implemented method of claim 1, wherein authenticating a user comprises:
    generating a verification matrix based on the original matrix, the authentication pin and the bit operation;
    comparing the verification matrix to the authentication matrix; and
    responsive to determining that the verification matrix matches the authentication matrix, authenticating the user.

10. The computer-implemented method of claim 9, further comprising:
    selecting a new bit operation;
    generating, based on the original matrix, the authentication pin, and the new bit operation, a new modified matrix; and
    transmitting the new modified matrix to the user device.

11. A system comprising:
    a processor communicatively coupled to a memory, the processor configured to:
        store an original matrix comprising a plurality of cells, wherein each of the plurality of cells is in a selected state or an unselected state;
        receive, from a user device, an original pin, wherein the original pin comprises a plurality of characters;
        select a bit operation;
        generate, based on the original matrix, the original pin, and the bit operation, a modified matrix;
        store the bit operation and delete the original pin from memory;
        transmit the modified matrix to the user device, and subsequently delete the modified matrix from memory; and
        responsive to receiving a user authentication request from the user device, the request comprising an authentication pin and the modified matrix, authenticate a user.

12. The system of claim 11, each of the plurality of cells of the original matrix has a state that is selected by a user.

13. The system of claim 11, wherein the bit operation comprises one of an AND operation, an OR operation, a NAND operation, or an XOR operation.

14. The system of claim 13, wherein the bit operation is pseudo-randomly selected.

15. A computer program product comprising a computer readable storage medium having program instructions embodied therewith the program instructions executable by a computer processor to cause the computer processor to perform a method comprising:

storing an original matrix comprising a plurality of cells, wherein each of the plurality of cells is in a selected state or an unselected state;

receiving, from a user device, an original pin, wherein the original pin comprises a plurality of characters;

selecting a bit operation;

generating, based on the original matrix, the original pin, and the bit operation, a modified matrix;

storing the bit operation and deleting the original pin from memory;

transmitting the modified matrix to the user device, and subsequently deleting the modified matrix from memory; and responsive to receiving a user authentication request from the user device, the request comprising an authentication pin and the modified matrix, authenticating a user.

16. The computer program product of claim 15, wherein each of the plurality of cells of the original matrix has a state that is selected by a user.

17. The computer program product of claim 15, wherein the bit operation comprises one of an AND operation, an OR operation, a NAND operation, or an XOR operation.

* * * * *